July 31, 1962 R. J. KUTZLER 3,046,681
CONTROL APPARATUS

Filed May 23, 1960 8 Sheets-Sheet 1

INVENTOR.
ROBERT J. KUTZLER
BY
ATTORNEY.

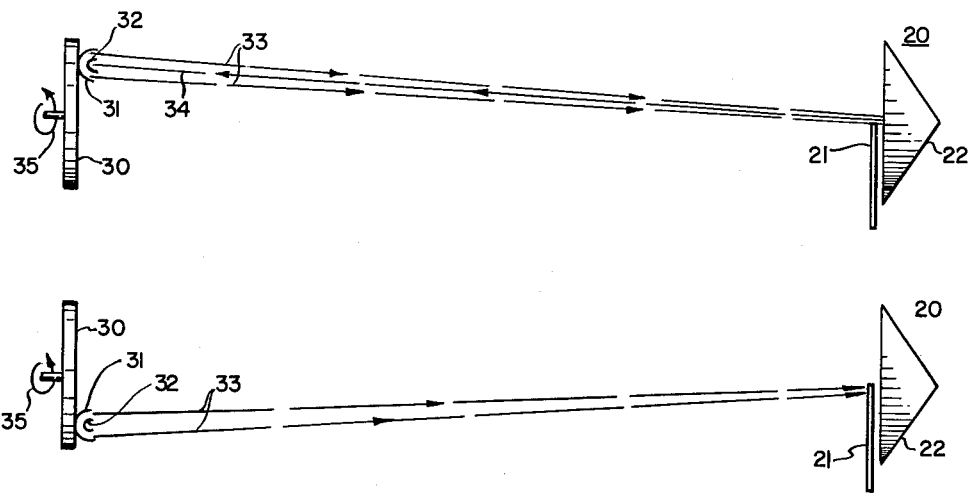
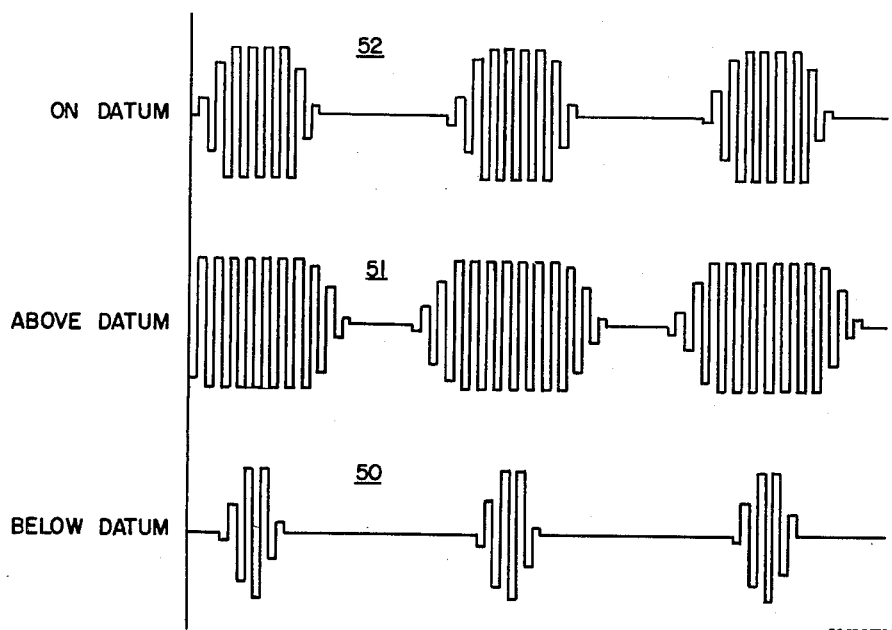
FIG. 3
FIG. 4

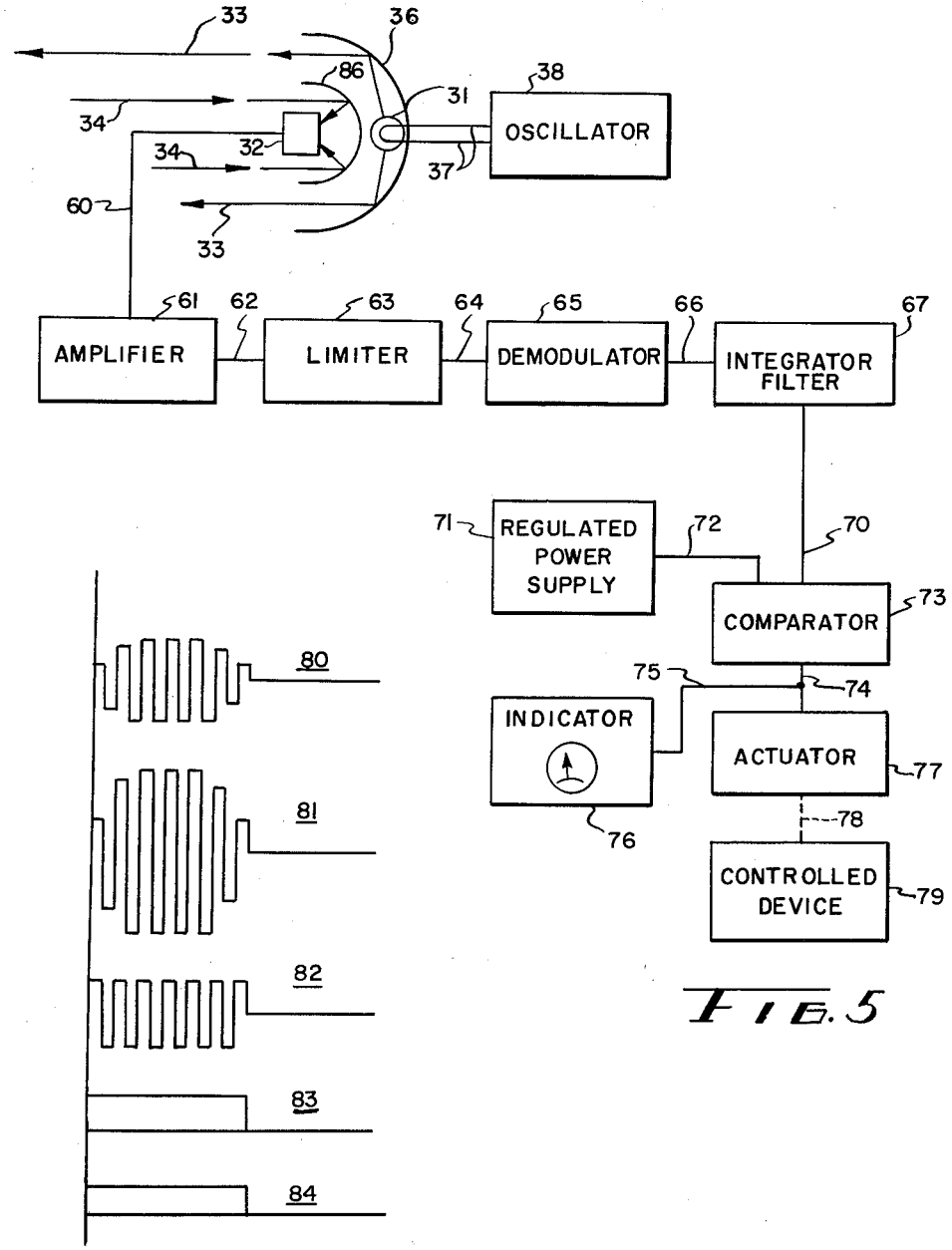

July 31, 1962   R. J. KUTZLER   3,046,681
CONTROL APPARATUS
Filed May 23, 1960   8 Sheets-Sheet 4

INVENTOR.
ROBERT J. KUTZLER
BY *Warren A. Sturm*
ATTORNEY.

July 31, 1962  R. J. KUTZLER  3,046,681
CONTROL APPARATUS
Filed May 23, 1960  8 Sheets-Sheet 6

INVENTOR.
ROBERT J KUTZLER
BY
ATTORNEY

July 31, 1962  R. J. KUTZLER  3,046,681
CONTROL APPARATUS

Filed May 23, 1960  8 Sheets-Sheet 8

INVENTOR.
ROBERT J KUTZLER
BY
ATTORNEY.

United States Patent Office 3,046,681
Patented July 31, 1962

3,046,681
CONTROL APPARATUS
Robert J. Kutzler, St. Louis Park, Minn., assignor to Minneapolis-Honeywell Regulator Company, Minneapolis, Minn., a corporation of Delaware
Filed May 23, 1960, Ser. No. 31,172
10 Claims. (Cl. 37—143)

This invention relates generally to the method and apparatus for operating an earth moving instrumentality in such a manner that the attention and reaction required of a human operator is minimized. It is more particularly related to the automatic control of the operation of an earth moving instrumentality in a predetermined attitude and in a predetermined direction with respect to a reference datum.

In the prior art relating generally to the control of earth moving equipment, some effort has been directed toward stabilizing an earth moving instrumentality from reference apparatus responsive to gravity so as to present a constant attitude with respect thereto. The prior art further describes a system for controlling the attitude of an earth moving instrumentality from a reference plane of energy in such a manner that an elevation reference datum is established by propagating a plane of energy and, by the use of appropriately mounted sensors of the plane of energy, the elevation and attitude of an earth moving instrumentality may be controlled. In this system it is clear that the complexity of the elevation reference utilized will require an expensive, unwieldy apparatus in practical use. From a consideration of other prior art, it may be clear that elevation reference apparatus, in performing its intended function, falls short of providing a suitable system that may be accurate and will not require the same amount of surveying etc., as is presently done.

In my invention, I provide apparatus for establishing a reference datum that is simple, inexpensive, and highly portable. Upon a consideration of the remainder of the specification of my invention, it will become apparent that the reference datum utilized offers distinct advantages over those now available. It is believed that the accuracy of the reference datum utilized herein is such that the ordinary methods of surveying and laying out a roadway, for example, will be obsolete in that the reference itself may be surveyed into position by the persons responsible for directing the activities of the operators of earth moving equipment without necessitating the resurveying necessary for laying out working datum stakes and the like. Further, in at least one embodiment, all of the active equipment associated with the system I provide for controlling the attitude, elevation, and direction of earth moving equipment may be carried by the earth moving equipment itself rather than positioned remotely as is the case in the prior art.

It is therefore an object of my invention to provide a method and apparatus for automatically controlling the attitude of an earth moving instrumentality so as to provide optimum economic usage of the equipment and of the time of the individuals necessary in carrying out the duties associated with the art of earth moving.

It is another object of my invention to provide a reference datum utilizing a method and apparatus comprised of relatively simple and inexpensive apparatus that is compatible with present day earth working apparatus.

It is a further object of my invention to provide a highly accurate, simple means for providing a reference datum of the energy reflecting type.

It is a still further object of my invention to provide automatic controls for earth moving equipment that are capable of attaining and maintaining the degree of accuracy necessary to enable a relatively unskilled operator to equal or exceed the work quality of a skilled operator in a time that may be considered to be substantially less that that required.

These and other objects of my invention will become apparent from a reading of the appended specification, claims, and drawing in which:

FIGURE 3 is a sketch illustrating the principle utilized in sensing the elevation datum;

FIGURE 4 is illustrative of the signals that may be derived from the apparatus shown in FIGURE 3;

FIGURE 5 is a block diagram of the sensing apparatus that may be utilized in one embodiment of my invention;

FIGURE 6 is a family of curves illustratives of the signals appearing at various portions of the block diagram in FIGURE 5;

Figure 9:
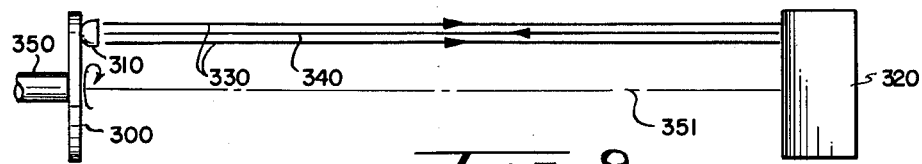
Figure 10:
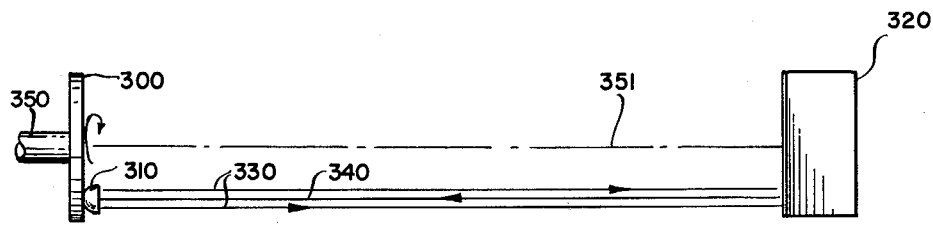
Figure 11:
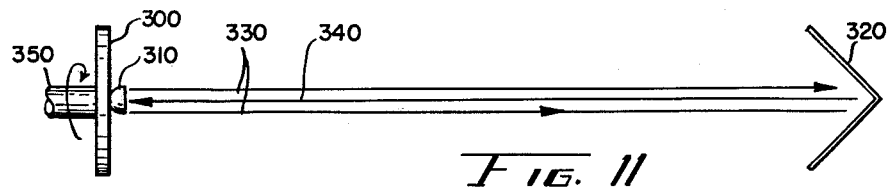
Figure 12:
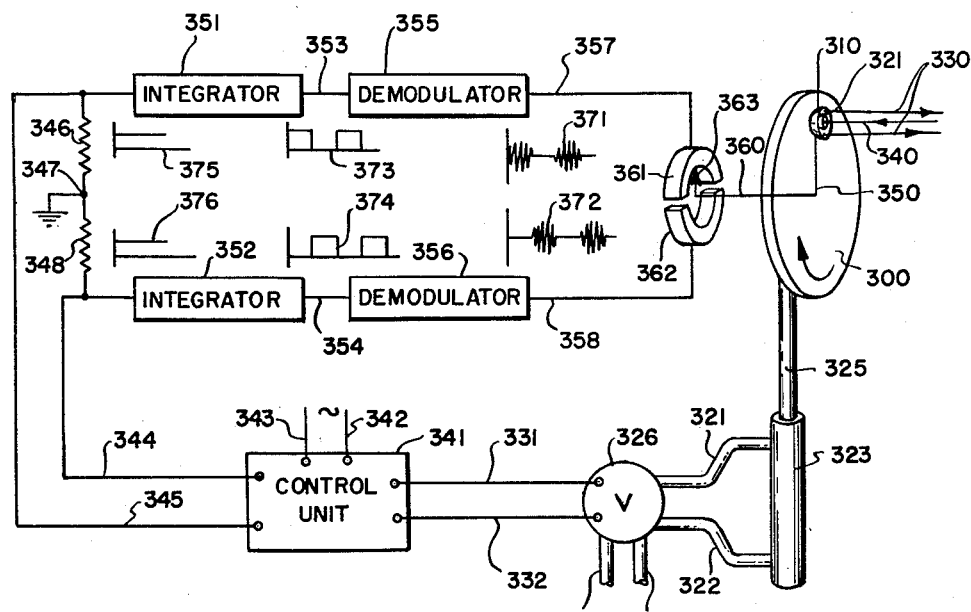
Figure 13:
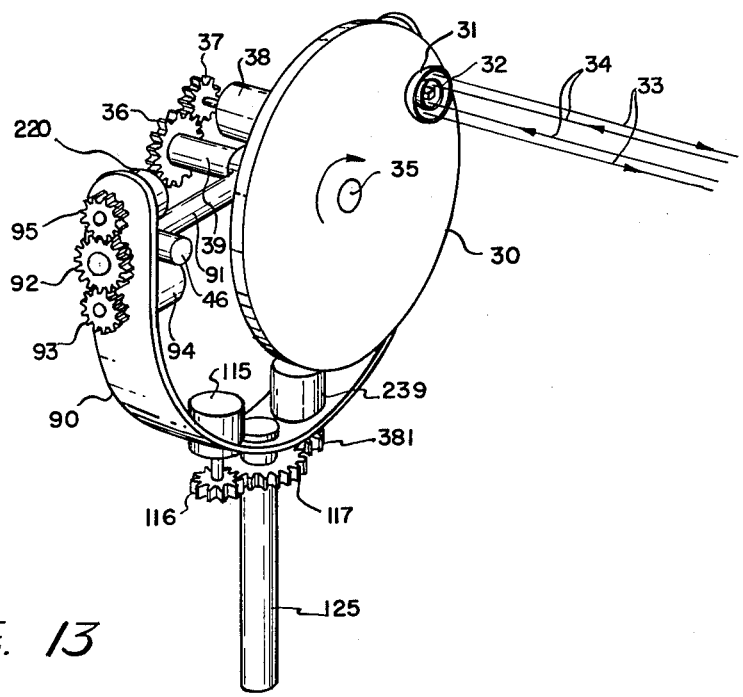
Figure 14:
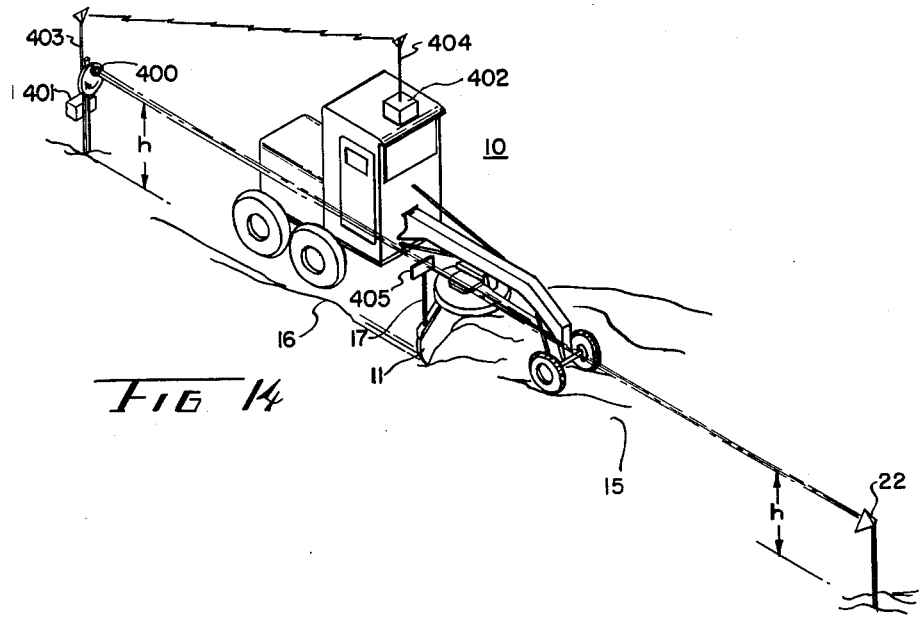
Figure 15:
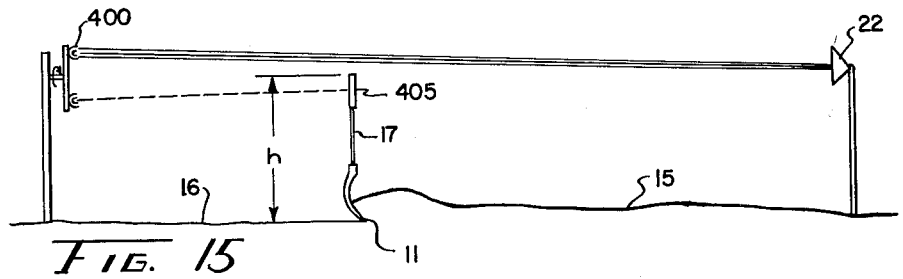

FIGURES 9, 10, and 11 are illustrative of the further embodiment of a reference datum apparatus and sensing means;

FIGURE 12 is a block diagram of an apparatus that may be used in a system embodying the principles shown in FIGURES 9, 10, and 11;

FIGURE 13 is a detailed sketch of one embodiment of a sensing means for sensing the reference datum;

FIGURES 14 and 15 illustrate a still further embodiment of my invention; and

Figure 16:
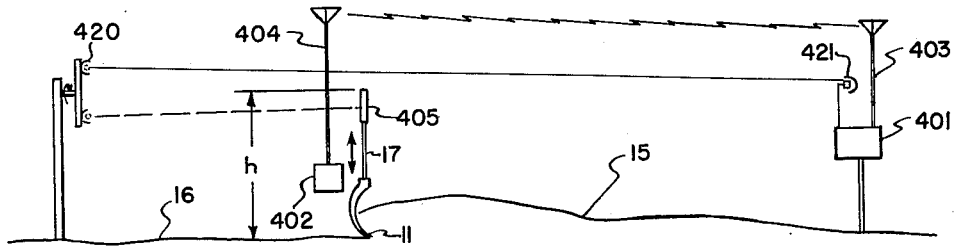

FIGURE 16 illustrates, diagrammatically a still further embodiment of my invention.

In the drawings, like characters have been applied where applicable to like devices and apparatus.

Figure 1:
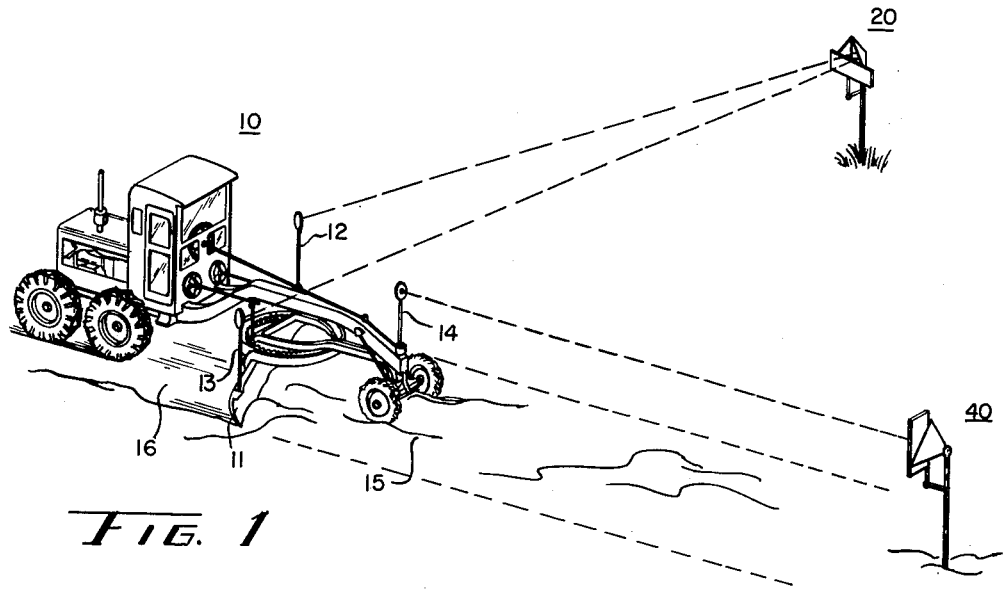
FIGURE 1 is a sketch showing the principles of my invention, embodied in a road grader.

Referring now to FIGURE 1, there is shown a vehicle 10, that is adapted to carry an earth moving instrumentality 11 to be positioned in space with regard to the reference datum provided by device datum 20, and to be controlled in its direction in accordance with a further reference datum provided by device 40. Datum sensing means 12 and 13 may be positioned at opposite ends of earth moving instrumentality 11 to sense the elevation reference datum of device 20 and thereby provide a control signal to control a motor means to position the earth moving instrumentality 11 relative to vehicle 10 in accordance with the elevation reference datum 20. A further sensing means 14 is utilized to sense the directional datum of device 40 and provides a signal that may be utilized to control the direction of movement of the road grader 10 so as to control the direction of movement of the earth moving instrumentality 11. Reference character 15 illustrates the terrain over which the road bed is to be constructed and reference character 16 illustrates the road bed formed by the movement of earth moving instrumentality 11 as it is carried along the desired road bed by the road grader 10.

Figure 2:
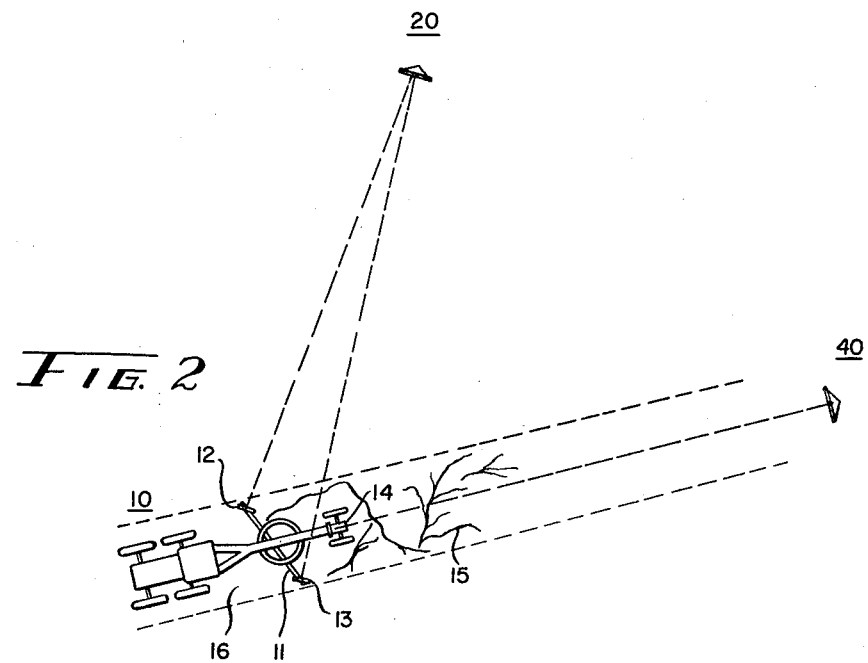
FIGURE 2 is a top view of the sketch of FIGURE 1.

FIGURE 2 is provided to show the relationship of the various components described above in FIGURE 1 from a top or plan view.

In the operation of the apparatus shown in FIGURES 1 and 2, the elevation datum sensors may be positioned a predetermined height above the cutting edge of earth moving instrumentality 11 dependent upon the height of the elevation datum reference device 20, above the desired elevation of the road bed 16. Elevation reference datum device 20, having been previously positioned in accordance with reference datums established by surveying methods, then provides a datum which may be sensed by the sensors 12 and 13 and, with appropriate control mechanism to be described below, the position of the earth moving instrumentality 11 relative thereto may be accurately controlled. Should it be desired that a straight line is to be traversed, a directional reference datum 40 may be used to control the direction of travel of the vehicle 10, upon which is carried the earth moving instrumentality 11. As will be noted below, the elevation reference datum provided by device 20 and the direction reference datum provided by device 40 may be utilized as either elevational or directional datums and are not intended to be limited only to horizontal or vertical datums. It will become apparent from the description below that the range of the apparatus is essentially limited only by the contour of the terrain that is to be worked upon.

Referring now to FIGURE 3, there is shown a reference datum device 20 that is comprised of a reflector 22 and a light restricting member or shadow board, 21. The reflecting member 22 may be comprised of three planar reflecting surfaces that are positioned so as to be mutually perpendicular to one another and when constructed in this manner, will have property of reflecting incident energy directly back upon itself as long as the source of energy has an unobstructed access to the apex formed by the intersection of the three planes. Hence any incident light from an area falling with the ⅛ sphere defined by the three mutually perpendicular surfaces, will be reflected back upon itself whenever the access to the apex of the reflecting surfaces is unobstructed. The reference datum is formed by a line defined by the top of the energy restrictive member, or shadow board, 21 and the apex of the reflecting surfaces of the member 22. The distance between the energy restrictive member 21 and the apex of the reflected member 22 determines, to some extent, the accuracy with which an imaginary line may be projected out toward a means mounted upon the road grader 10 for sensing the reference datum formed by the apex of the reflected means 22 and the restrictive means 21. In the particular embodiment shown in FIGURE 3, the device used to sense the reference datum comprises a rotatable member 30 mounted for rotation about an axis 35, a source of energy 31, which may be a modulated source of light, and a detector of energy which may be, in the case of light, a lead sulfide detector 32. The arrows 33 represent energy emanating from the source 31 and the arrows 34 represent the energy incident upon reflector 22 and reflected back toward the source 31. It is desirable that the source 31 and the sensing means 32 be mounted in close proximity upon the rotatable member 30. The top half of FIGURE 3 illustrates the fact that light may be transmitted to reflector 22 and reflected back toward detector means 32 when they are above the reference datum, and the lower half of FIGURE 3 illustrates that no light will be reflected back toward detecting means 32 when the source of energy 31 and detector means 32 are positioned below the reference datum line determined by the restrictive means 21 and the apex of reflector 22. It will be understood that various types of energy may be used for sensing of the reference datum and a discussion of the particular reflector utilized in this embodiment may be seen in U.S. Patent 1,384,014.

The energy restrictive member, or device adapted to prevent the transmission of energy 21 may be positioned, horizontally, to form an elevation reference, vertically, to form a directional reference, at an angle to the horizontal, to form a sloping reference, or may be curved or otherwise shaped to provide a reference to be used for any contour.

FIGURE 4 contains curves 52, 51, and 50, and is illustrative of the different signals that are received by the detector means 32 as a result of its rotation about the axis 35. Curve 52 shows that the detector means 32 will "see" the reflector 22 one-half of the time of one cycle of rotation of rotating means 30 about axis 35, and that this will occur when the axis 35 is coincident with the line projected from the reference datum line determined by the restrictive member 21 and reflector 22. Curve 51 illustrates that the detector means 32 will receive a signal for more than one-half the time during one rotation of rotating member 30 to indicate that the axis of rotation of rotating member 30 is above the reference datum and receives a signal for less than half the time during one rotation of rotating means 30 when the axis of rotation is below the reference datum.

FIGURE 5 illustrates an embodiment of a control system that might be used in apparatus embodying the principles of my invention. A source of energy 31 is shown energized from an oscillator 38 through conductors 37. The source of energy 31 may be positioned at the focal point of a reflector 36, to provide a beam of energy to be projected toward the reference datum. A further reflector 86 is positioned concentrically of reflector 36 and mounted inside of reflector 86, at its focal point, is a detecting means 32. Arrows 33 represent transmitted energy and arrows 34 represent reflected energy from the reference datum. Detecting means 32 is connected to an amplifier 61 through conductor 60. Amplifier 61 is connected to limiter 63 through conductor 62. Limiter 63 is connected to demodulator 65 through a conductor 64. Demodulator 65 is connected to integrator 67 through a conductor 66.

Integrator 67 is connected to a comparator 73 through a conductor 70. A regulated power supply 71 is also connected to comparator 73 through conductor 72. The output of comparator 73 is connected to an indicator 76 through a conductor 75 and to actuator 77 through a conductor 74. Actuator 77 is connected to a controlled device, or earth moving instrumentality 79, through connecting means 78. Oscillator 38 may be any suitable device for providing energy of a predetermined frequency so as to modulate the energy source 31 at a predetermined frequency that is substantially higher than the frequency of revolution of the source of energy and detecting means about axis 35. Amplifier 61 may be of the voltage amplifier type well known in the art. The limiter 63 may be a suitably connected diode to limit the amplitude of the signal passing through it. Demodulator 65 may be of the diode detector type for eliminating the high frequency oscillations provided by the oscillator 38. Integrator filter 67 may be any one of a number of devices that provides an integral output signal in response to an input signal having a filter comprised of capacitors of suitable value. Comparator 73 may be any suitable device that provides an output signal equivalent to the difference between an input signal and a reference signal as supplied from the regulator power supply 71. Indicator 76 may be a meter responsive to a D.C. signal. Actuator 77 may be any device responsive to the signal from comparator 73 and of suitable capacity for positioning an earth moving instrumentality in response to the output of comparator 73.

FIGURE 6 contains a plurality of curves illustrative of the outputs of various components in the system shown in FIGURE 5. Curve 80 shows the output of detector means 32. Curve 81 shows the amplified output as appearing at the input to limiter 63. Curve 82 shows the output of limiter 63 that has been limited to a predetermined value. Curve 83 shows the output of demodulator 65. Curve 84 shows the output of integrator 67 that is utilized in comparator 71 to be compared with the reference potential supplied by the regulated power supply 71. It should be apparent that the amplitude of curve 84 is directly proportional to the average position, or the position of the axis of rotation, of the detector means 32 with respect to the reference datum. The amplitude increases as the axis of rotation of detector means 32 about axis 35 rises above the datum reference and decreasing as the axis 35 of detector means 32 falls below the reference datum and is of a particular value when the axis of rotation of detector means 32 is coincident with the reference datum. Comparator 71 may be of the type that sums the output of integrator 67 with a voltage having an amplitude equal or proportional to the amplitude of the output of integrator 67 when the sensor 32 is rotating, or has a reciprocating cyclical motion, about an axis coincident with the reference datum. The summation of the two signals may be essentially zero so that when the output of the sensor, or detector 32, increases or decreases, the output from comparator 71 will increase or decrease in a positive or negative sense depending upon the direction and distance of the displacement of the axis of rotation of detector means 32 from the desired position coincident with the reference datum. This control signal may then be used to provide an indication of such deviation or may be applied to a control system as represented by actuator 77 and the controlled device 79.

Figure 7:
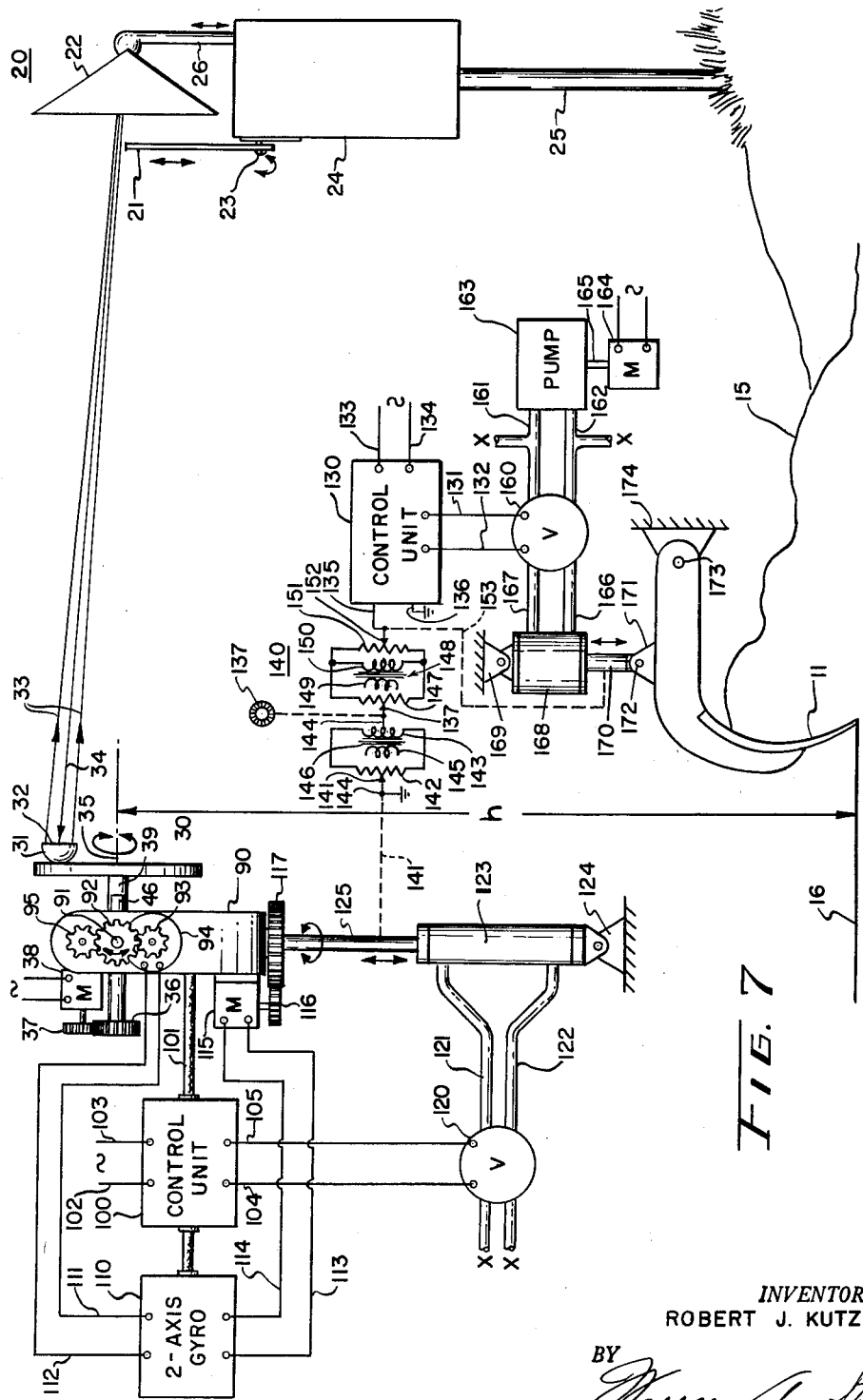
FIGURE 7 is a sketch of the apparatus showing how it may be applied to control an earth moving instrumentality in accordance with the reference datum.
Figure 8:
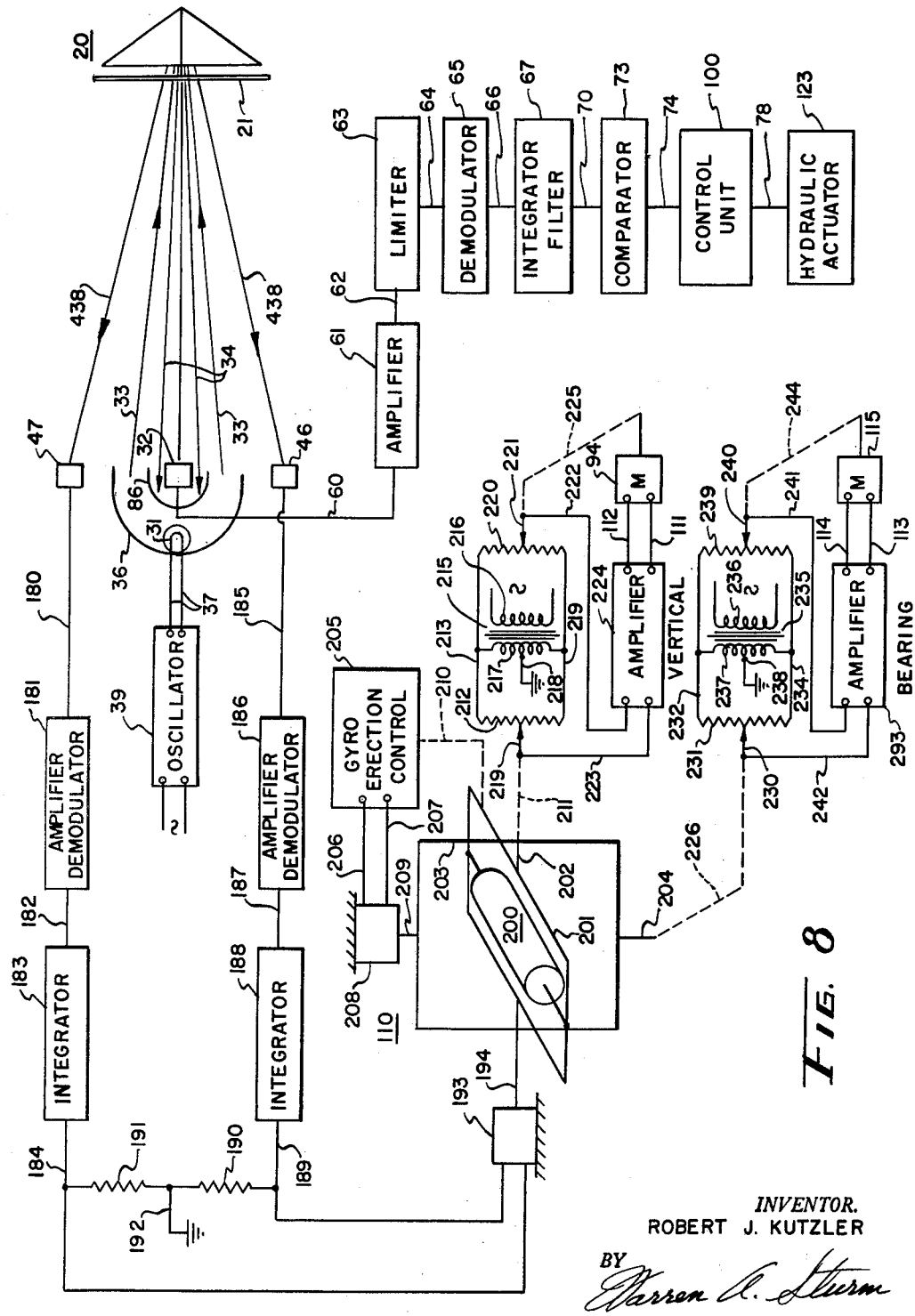
FIGURE 8 is a schematic-block diagram of the control apparatus shown in FIGURE 7.

FIGURES 7, 8, and 13 are schematic diagrams and sketches showing the principles of my invention as might be utilized in an embodiment for controlling the elevation, or attitude, of an earth moving instrumentality with respect to a reference datum. FIGURE 7 may be divided into three sections, the right hand section contains apparatus for establishing an elevation reference datum, the left hand end contains apparatus for sensing the elevation reference datum, and the center portion contains apparatus for positioning an earth moving instrumentality in accordance with said elevation reference datum. The elevation reference datum is comprised of a standard 25 firmly positioned in the ground, a housing containing appropriate mechanism for positioning a reflector 22 mounted upon an adjustable mounting element 26 and further positioning a restriction, or shadow board, 21 mounted for rotational movement about axis 23 and which may also be moved in an up and down direction for placement with respect to the apex of the reflector 22 mounted on movable member 26. An elevation reference datum is established by suitably positioning the apex of the reflector at the desired elevation and further positioning the top edge of shadow board 21 also at the desired elevation. The line formed by the top of shadow board 21 and the apex of the reflector forms an elevation reference that may be sensed and utilized by the apparatus to be described below. Although shadow board 21 is mounted on standard 25, it should be apparent that it is shown in this manner only to illustrate one embodiment and may be mounted on a separate standard and remotely of reflector 22.

The left hand end of the FIGURE 7 is comprised of apparatus that would normally be mounted somewhere upon a vehicle that is adapted to carry an earth moving instrumentality. In a manner similar to that described above, transmitting and receiving elements 31 and 32 are mounted on a disc member 30 which is further adapted to be rotatable amout an axis 35. Axis 35 is suitably mounted in a bearing or journal 39 and has affixed to its left hand end a gear member 36 that is driven through a gear member 37 that is in turn driven from a motor 38 which may be energized from a suitable source of current. Positioned at right angles to journal 39 is a further shaft 91 that is appropriately journalled in a gimbal member 90. Shaft 91 has affixed to one end a gear 92 that is adapted to co-act with a gear 93 driven from the output shaft of motor 94 and a gear 95 connected to a follow-up potentiometer 220. It may therefore be noted that the axis of rotation 35 is rotatable about a further axis, or shaft, 91. Gimbal 90 is rotatably mounted upon the ram 125 of a hydraulic cylinder 123 that is securely mounted on a portion of the vehicle through mounting means 124. Gimbal 90 has affixed to it a gear 117 that is adapted to be driven from gear 116 that is in turn driven from the output shaft of motor 115. It should therefore be noted that, in the present embodiment the gimbal 90 may be rotated about a generally vertical axis formed by the axis of ram 125. Motors 94 and 115 are connected through suitable circuitry, described below, to a two axis gyroscope 110 and are utilized so as to maintain the axis of rotation 35 of member 30 in an attitude such that it will remain substantially parallel to the reference datum and further will be directed substantially toward the elevation reference datum 20.

A control unit 100, energized from a suitable source of alternating current through terminals 102 and 103, is connected to the sensing devices through appropriate connections contained in cable 101. The output of control unit 100 is supplied to a hydraulic valve 120 through leads 104 and 105 and is, as described above, a signal that will operate the valve in such a manner that the hydraulic ram will position the axis of rotation, 35, in accordance with the elevation reference datum. Valve 120 is connected to a hydraulic cylinder 123 through conduits 121 and 122 and to a source of hydraulic pressure, shown as pump 163, through conduits 161 and 162. Pump 163 is connected to shaft 165 that is driven by motor 164 which may be energized from a suitable source of current. The center portion of the drawing shows an earth moving instrumentality, shown as a grader blade 11, operating upon an irregular area 15 to provide a smooth area 16. Grader blade 11 is carried upon element 171 that is in turn connected through pin 173 to element 174 connected to the frame of the vehicle upon which the earth moving instrumentality is carried and which may be considered as the draw bar on a road grader. A hydraulic cylinder 168 having a ram 170 connected to element 171 through pin 172 and to the frame of the vehicle through mounting means 169 is adapted to provide relative up and down movement of the grader blade 11 with respect to the vehicle upon which it is mounted. The position of ram 170 of hydraulic cylinder 168 may be controlled by the operation of valve 160 that is connected to hydraulic cylinder 168 through conduits 166 and 167. Hydraulic valve 160 is supplied with hydraulic fluid under suitable pressure from hydraulic pump 163 through conduits 161 and 162. The opeartion of hydraulic valve 160 is controlled by control unit 130, the output of which is connected to hydraulic valve 160 through leads 131 and 132. Control unit 130 may be suitably energixed from a source of alternating current through leads 133 and 134. A pair of input terminals 136 and 135 are provided for connection to a source of input signals to control the operation of hydraulic valve 160 to position ram 170 of hydraulic cylinder 168. Input terminal 135 is connected to potentiometer wiper 152 and input terminal 136 is connected to ground. Potentiometer 151 and potentiometer 147 are connected in parallel with transformer secondary winding 150 on transformer 148 also having a primary winding 149 to be suitable energized from a source of alternating current. Potentiometer wiper 137 is connected to center tap 144 of secondary winding 143 on transformer 146 having a primary winding 145 adapted for connection to a suitable source of alternating current. A further potentiometer 142 is connected in parallel with the extremities of transformer secondary winding 143. A potentiometer wiper 141 is connected to ground and is drivingly connected to the ram 125 of hydraulic cylinder 123. Potentiometer wiper 152 is connected to the ram 170 of hydraulic cylinder 168 through driving means 153.

FIGURE 13 is a futrher sketch of the mechanism utilized for stabilization of the sensing apparatus for detecting the reference datum and indicates the relative position of parts described above and below in connection with the particular embodiment of stabilization utilized. It may be noted, at this time, that while a highly stabilized apparatus for detecting the reference datum is utilized in the present embodiment, a less complex arrangement may also provide suitable operation. For instance, since the reflector utilized in the reference datum has the properties of reflecting any incident radiation back toward its source, and a source such as a point source, may be utilized, the reflectors shown in conjunction with the source of radiation and the detector may be dispensed with and the reciprocating movement of the source and detector relative to the reference datum could be provided in a manner so as not to require the high degree of stabilization resorted to in the present embodiment. This could be done in any manner that would not restrict the line of sight between the source and detector and the reference datum during its reciprocation. Then it would only be necessary to provide that the reciprocatory motion could not be parallel to the top edge of the shadow board utilized to create the reference datum.

FIGURE 8, which should be read in conjunction with FIGURES 7 and 13, illustrates, in block diagram and schematic drawing, a top view representation of portions of the embodiment of those figures. The right hand end of FIGURE 8 is more or less a duplication of the features shown in FIGURES 3, 4, 5, and 6 and like apparatus contains like reference characters. An elevation reference datum 20 is shown in the plan position, and includes shadow board 21. A source of energy 31, is connected to oscillator 39 through leads 37 and is positioned at the focal point of a reflector means 36 to project energy toward the reference datum shown as lines 33. A sensor or detector means 32 is positioned at the focal point of a further reflector 86 mounted concentrically of reflector 36 and receives energy reflected from the reference datum 20 as indicated by lines 34. Detector 32 is connected to amplifier 61 through lead 60 and to a limiter 63 through a lead 62. The output of limiter 63 is connected to demodulator 65 through lead 64. The output of demodulator 65 is connected to an integrator-filter 67 through lead 66 and thence to comparator 73 through lead 70. The output of comparator 73 is connected to control unit 100 through a lead 74 and the output of control unit 100 is connected to hydraulic actuator 123 through lead 78. It is understood that the hydraulic actuator 123 would include a valve 120 that is connected to the output of control unit 100 as shown in FIGURE 7.

The apparatus for stabilizing the vertical attitude of disc member 30 of the datum detecting mechanism and also the horizontal direction of axis 35 is shown schematically in the left hand portion of FIGURE 8 and includes a gyroscope 110 the output of which is utilized to control the operation of motor 115 and thus the horizontal bearing direction of axis 35 in response to the relative magnitudes of the signals received by sensors, or detectors 46 and 47, and to control motor 94 and thus the vertical attitude of disc member 30. FIGURES 7 and 13 show one of the detectors, 46, positioned at the left hand extremity of axis 91. Detector 47 is positioned at the right hand extremity of axis 91 so that when equal signals, as shown by lines 438, are reflected from reference datum 20 to detectors 46 and 47, the apparatus will maintain the sensing mechanism in a horizontal direction attitude or bearing pointing generally toward the reference datum 20. The output of detector 47 is connected to amplifier demodulator 181 through lead 180. The output of amplifier demodulator 181 is connected to integrator 183 through lead 182 and thence to ground connection 192 through lead 184 and resistor 191. Detector 46 is connected to amplifier demodulator 186 through lead 185. The output of amplifier demodulator 185 is connected to integrator 188 through lead 187. The output of integrator 188 is connected to ground terminal 192 through lead 189 and resistor 190. The sum of the outputs of integrators 183 and 188, appearing across resistors 191 and 190, is in turn connected to a torque motor 193 through leads 184 and 189. The output of torque motor 193 is drivingly connected to the input axis 194 of gyro 110.

Gyro 110 includes a rotor 200, an inner gimbal 201 having an input axis 194 and an output axis 202, an outer gimbal 203 having an input axis 209 an output axis 204, torque motors 193 and 208, and a gyro erection control apparatus 205 that is connected to inner gimbal 201 through connecting means 210 and is connected to control the operation of torque motor 208 through leads 206 and 207 to provide a vertical erection control system for the gyro. Electrical servomechanisms are utilized to control the attitude of the reference datum sensing device from the output of gyro 110 both in a vertical sense and in a directional sense. It may be seen that the spin axis of gyro 110 is maintained in a horizontal direction attitude or bearing pointing generally toward the reference datum. A well known bridge arrangement including potentiometers 212 and 220, and transformer secondary winding 217 connected in parallel therewith, is utilized to control the operation of a motor 94 through amplifier 224 to thus control the vertical attitude of disc member 30. The transformer 215 includes a primary winding 216 and a grounded center tap 218, secondary winding 217 being connected in parallel with potentiometer windings 212 and 220 through leads 213. Wiper 219 on potentiometer winding 212 is drivingly connected to the output axis 202 of gyro 110 through a driving means 211 and is electrically connected to an input terminal of amplifier 224 through lead 223. Potentiometer wiper 221 on potentiometer 220 is drivingly connected through driving means 225 to the output of the motor means 94 and is electrically connected to an input terminal of amplifier 224 through lead 222. The output of amplifier 224 is connected to motor 94 through leads 111 and 112 to position axis 35 about axis 91, see FIGURES 7 and 8. A further servo system is utilized to control the horizontal direction attitude or bearing of the datum detecting apparatus so that it will remain in a direction pointed generally toward the reference datum 20. This servo system is similar to that described above and includes a potentiometer winding 231, a potentiometer winding 239, connected in parallel through leads 232 and 234, and is energized from center-tapped secondary winding 237 of transformer 235. Center tap 238 on secondary winding 237 is connected to ground. Transformer 235 also includes a primary winding 236 adapted for connection to a suitable source of alternating current. The wiper 230 of potentiometer winding 231 is drivingly connected to output axis 204 on gyro 110 through driving means 226 and is electrically connected to an input terminal of amplifier 243 through lead 242. Potentiometer wiper 240 of potentiometer winding 239 is drivingly connected to the output of motor means 115 through a driving means 244 and is electrically connected to the input of amplifier 293 through lead 241. The output of amplifier 293 is connected to motor 115 through leads 113 and 114 to control the position of axis 35, see FIGURES 7 and 8.

*Operation of FIGURE 7*

Gyro 110 is a directional gyroscope which is stabilized in one attitude by the gyro erection control 205 and is controlled in another attitude by means including detectors 46 and 47. Initially the spin axis of rotor 200 is pointed toward datum device 20. The spin axis may deviate from this original attitude due to friction forces such as windage inherent within the gyroscope. When this deviation occurs however, gyro erection control 205 is effective to correct such error and maintain the initial spin axis attitude. Should vehicle 10 pitch in this direction, the supporting structure of gyro 110 is displaced relative to rotor 200 and wiper 219 moves to cause movement of motor 94 to both move wiper 221 to rebalance the electrical network controlling motor 94 and to also move disc member 30 about axis 91, thus keeping axis 35 parallel to the datum reference. If height correction is indicated, such correction takes place by virtue of the control means including hydraulic actuator 123. Thus, with both height control and stabilization of axis 35, axis 35 is maintained at the datum reference.

Also, the direction or bearing of the spin axis of gyro 110 may deviate from device 20. This may occur either due to the above mentioned gyro friction forces or due to movement of vehicle 10 relative to device 20. In either event, sensors 46 and 47 are effective to develop a control signal to control torque motor 193 and thus move gimbal 203 through the gyroscopic action by torque motor 193 exerting a force on gimbal 201. This movement of gimbal 203 causes wiper 230 to move to thereby cause movement of motor 115. Motor 115 moves wiper 240 to rebalance the electrical network which controls motor 115 and also moves disc member 90 about axis 125 to maintain the direction or bearing to the gyro spin axis at an attitude pointing toward device 20. Reference should also be had to FIGURES 8 and 13 in considering the operation of the apparatus shown in FIGURE 7. Briefly, the operation of FIGURE 7 may be divided into the utilization of four portions of the apparatus, that is the reference datum means 20, the sensing of the reference datum through the sensing device positioned on the vehicle upon which the earth moving instrumentality is carried, a stabilization system for maintaining the detector, or sensing, apparatus in suitable attitude, and a servo system for positioning the earth moving instrumentality 11 in relationship to the vehicle upon which it is carried in response to the position of the reference datum detecting apparatus.

An explanation has been provided above in regard to the utilization of the elevation reference datum apparatus as used in conjunction with the detecting apparatus and need not be repeated here.

The disc 30 mounted for rottaion about axis 35 is maintained in a substantially vertical position by controlling its attitude about the axis 91 from the signal generated by gyro 110 through the operation of its self-contained gyro erection control and the operation of the servo system that is responsive to the output of gyro 110 appearing at output axis 202 to control the motor 94. The relative bearing of the disc 30 is controlled so that the line passing through its axis of rotation 35 will point in a direction generally toward the apex of the reflector 22 on the reference datum means 20 as illustrated on the upper right hand portion of FIGURE 8. The detectors 46 and 47, when the disc 30 is pointed in a direction generally toward the reflector 22, will receive substantially equal amounts of reflected energy from reflector 22 as indicated by lines 438. The outputs of detectors 46 and 47 are demodulated in demodulators 186 and 181 and integrated in integrators 188 and 183 respectively. The outputs of the integrators are connected to ground through resistors 190 and 191 respectively so that when they are equal, the voltage appearing between conductors 184 and 189 is zero. When the bearing of axis 35 deviates from an attitude pointing generally toward the reference datum 20, a signal of one polarity or another will appear across the center tapped resistors 191 and 190 and is used to actuate the torque motor 193, mounted on gyro 110. This in turn causes the gyro to precess and the signal appearing at the output axis 204 is then utilized to properly orient the sensing apparatus through operation of its associated servomechanism that is utilized to drive motor 115. It will be apparent to those skilled in the art that other forms and methods may be utilized in providing the stabilization that is provided in this embodiment through the use of gyroscopic apparatus.

In the manner described above, the axis of rotation of the disc 30 upon which is carried the sensing means 32, will be positioned coincident with the reference datum established by the reference datum means 20. Any deviation therefrom will be indicated by the output of the sensing means 32 and the control unit will be operated in response thereto to reposition the axis of rotation 35 of the sensing means through actuation of hydraulic cylinder 123. It may therefore be seen that regardless of the motion of the vehicle upon which is carried the earth moving instrumentality 11, the axis of rotation of the disc 30 will remain at substantially the same position in space with respect to the reference datum. The position of the earth moving instrumentality 11 with respect to the reference datum detector is determined by the position of adjustable potentiometer wiper 137 on potentiometer 147. Once this potentiometer wiper is set, the servomechanism will control the position of the earth moving instrumentality 11 with respect to the frame of the vehicle in accordance with the position of wiper 144 associated with potentiometer 142 and which is drivingly connected to the ram 125 of hydraulic cylinder 123 through the driving means 141. The distance $h$ shown in the center of the drawing is representative of the off-set between the reference datum and the actual earth surface, 16, which is desired surface to be generated by the earth moving instrumentality 11. Any deviation from this distance $h$ as sensed by the bridge arrangement 140, will result in a signal input to control unit 130 that will in turn actuate hydraulic valve 160 to cause hydraulic cylinder 168 to reposition the earth moving instrumentality to the desired off-set or distance $h$ from the reference datum.

It may be noted that the sensing mechanism may be mounted directly upon the earth moving instrumentality, as shown in FIGURE 1, however, in this embodiment, it will be noted that it would be possible to provide a greater range of adjustability for the distance $h$ between the reference datum and the earth to be worked upon and further, the forces to which the sensing apparatus might be subjected to, would be substantially less where it is mounted upon the frame of the vehicle, as distinguished from direct mounting upon the earth moving instrumentality.

It may further be noted that a second system the same as shown in FIGURE 7 may be used and that one of the systems may be used at each end of the blade to control both elevation and transverse slope of the earth moving instrumentality with respect to the strip or road bed it is preparing. A third such system, rotated 90° may be used, as in FIGURE 1, to provide a directional signal to control the steering of the vehicle upon which it is utilized.

FIGURES 9, 10, 11, and 12, illustrate a further embodiment of my invention in which a different form of reference datum is utilized and which might be used in the apparatus shown in FIGURE 7.

FIGURE 9 shows a disc 300 mounted for rotation about an axis 350 and which carries a transmitting and detecting mechanism 310 that contains a source of radiation and a radiation detecting means mounted in proximity thereto. Lines 330, emanating from the source of radiation, are reflected from a reflective means 320 back toward the sensor means as indicated by line 340. The reflector means 320, which provides a reference datum, is comprised of a pair of reflective surfaces mounted at right angles to one another and provide a reference datum indicated by center line 351 that is perpendicular to the axis of intersection of the two reflective surfaces and, for practical purposes, may be considered to emanate from the mid-point of the line defined by the axis of intersection of the reflective surfaces.

FIGURE 10 contains the same elements as shown in FIGURE 9 only the disc 300, carrying the transmitting-detecting means, has rotated 180°.

FIGURE 11 is a top view of the apparatus shown in FIGURES 9 and 10 and illustrates the relative positions of the transmitted and reflected energy incident upon the reference datum 320.

FIGURE 12 illustrates one embodiment of a control system that might be used to position the axis of rotation, 350, of the sensing means coincident with the reference datum established by the reference datum 320. In this embodiment, a modulated source of radiation is utilized to propagate energy as shown by the lines 330 which is in turn reflected from the reference datum 320 as shown by the line 340 to a detector means 321 positioned in close proximity to the source of modulated radiation. The output of detector means 321 is connected through a wiper 363 to a pair of commutator rings 361 and 362. These are electrically insulated from one another and positioned so that the output of the detector means is connected to lead 357 for the time that its position is above the reference datum and connected to a second lead 358 when its position is below the reference datum. Commutator 361 is connected to ground terminal 347 through lead 357, demodulator 355, lead 353, integrator 351, lead 345, and resistor 346. Commutator 362 is connected to ground terminal 347 through lead 358, demodulator 356, lead 354, integrator 352, lead 344 and resistor 348. The voltage appearing across the center tapped resistor combination 346 and 348 is applied to the input terminals of control unit 341 through leads 344 and 345. Control unit 341 includes terminals 342 and 343 for energization from a suitable source of alternating current and a pair of output terminals connected to control hydraulic valve 326 through leads 331 and 332. Hydraulic valve 326 may be supplied from a suitable source of hydraulic fluid under pressure through conduits 327 and 328. The output of hydraulic valve 326 is used to control the position of ram 325 on hydraulic cylinder 323 through conduits 321 and 322 to position the axis of rotation, 350, of disc 300 in accordance with the reference datum.

*Operation of FIGURE 12*

The small curves shown in FIGURE 12 as indicated by reference characters 371, 373, 375, and 372, 374, 376 indicate the signals appearing in the various components when the detector means is positioned so that the axis of rotation of disc 300 is coincident with the reference datum. In this attitude, energy supplied to commutator 361 will be equal to and 180° out of phase with the energy supplied to commutator 362. This is shown by curves 371 and 372. The modulated signal is applied to demodulators 355 and 356, the output of which is shown by curves 373 and 374. This signal is then integrated to provide a D.C. output, as represented by curves 375 and 376, which, when applied to the differentially connected center tapped resistor combination 346 and 348, results in no signal output appearing across leads 344 and 345. Should the axis of rotation of the detector means rise or fall above or below the reference datum, the signal received by one or the other of the commutator segments will be less and accordingly a voltage proportional to the difference will appear across leads 344 and 345 that may be used to actuate hydraulic valve 326 to reposition ram 325 so as to return the axis of rotation 350 to a position that is coincident with the reference datum.

FIGURES 14 and 15 illustrate a still further embodiment of my invention. FIGURE 14 shows a vehicle 10, upon which is carried a control system for providing relative movement between the vehicle and earth moving instrumentality 11 mounted thereon. The vehicle is shown traveling a substantially straight line and is operating upon rough surface 15 to provide a smooth road bed 16 through the operation of the earth moving instrumentality 11. A mounting means 17 is connected to earth moving instrumentality 11 and carries at its upper end a shadow board 405, similar to those previously described. The shadow board 405 is to be positioned in accordance with the reference datum established by the reflector means 22 and the axis of rotation of a rotatably mounted detector-transmitter means, both of which have been positioned at a predetermined distance $h$ above the desired road bed. The position of the shadow board 405 with respect to the beam of energy passing between the detector-transmitter means and the reflector means 22 determines the relative amount of transmitted signal that is received by the detector means and, in a manner described above in conjunction with FIGURES 3, 4, 5, and 6 and FIGURES 9, 10, 11, and 12, may be utilized to provide a control signal to be transmitted through radio transmitter 401, and antenna 403 to antenna 404 and radio receiver 402 on the vehicle to control the position of the earth moving instrumentality 11 and thereby shadow board 405 so that its position remains substantially on the reference datum established as noted above.

FIGURE 15 illustrates diagrammatically the manner in which the system might operate when utilizing the particular embodiment shown in FIGURE 14 for establishing and sensing the reference datum. The side view representation shows an earth moving instrumentality 11 moving between the reflector means 22 and the transmitter-receiving means 400 that is rotatably mounted about an axis of rotation and the reference datum provided at a distance $h$ above the desired surface 16 is established by the apex of the reflective means 22 and the axis of rotation of the transmitter-detector means 400. Again the shadow board 405 is mounted upon a mounting means connected to the earth moving instrumentality 11. As noted above, when the detector means receives a signal of reflected energy incident upon the reflector means 22 for substantially one-half the time during its period of one revolution, the shadow board 405 will be positioned coincident with the reference datum. Deviation of the shadow board 405 from this position will affect the amount of signal received by the detector means and this may be utilized, in the manner described above, to transmit a radio signal to the control system mounted upon the vehicle upon which the earth moving instrumentality 11 is carried to reposition the shadow board, and thereby the earth moving instrumentality 11, to the desired reference datum.

FIGURE 16 shows still a further embodiment in which a reference datum is established by positioning a detector means 421 at one extreme of an area to be worked upon and the axis of rotation of a rotatably mounted transmitter, 420, of radiant energy, at the other extreme. Again the shadow board 405 is mounted upon mounting means 17 that is connected to earth moving instrumentality 11 and is to be carried upon a vehicle containing the necessary radio receiving equipment and control equipment for positioning earth moving instrumentality 11 relative thereto. Again, the detector means 421 will receive a signal from the transmitter means 420 for approximately one-half the time of a complete revolution of transmitter means 420 when the shadow board 405 is positioned with its top edge coincident with the reference datum previously established.

A clear understanding of the principles of my invention should indicate to one skilled in the art that a plurality of datum sensors may utilize a common datum and be used in separate equipment or operate a common earth working instrumentality in a predetermined manner. Further, under the proper circumstances, both a vertical and horizontal, or other combination, datum may be obtained by suitable shaping and dimensioning of the above described shutter boards.

It should now be apparent that my invention is capable of a number of modifications, each adaptable to certain operating conditions encountered in the art of moving earth. Therefore, I intend it to be limited solely by the scope of the appended claims.

I claim as my invention:

1. Control apparatus comprising; an earth working instrumentality; a vehicle adapted to carry said earth working instrumentality; control means mounted on said vehicle and connected to control the position of said instrumentality relative to a reference datum; means for establishing a reference datum including a tri-planar reflecting device and further means for selectively limiting the reflection of incident energy thereon so that a reference datum is defined by the apex of said reflecting device and said selective limiting means; transmitting and receiving means carried by said vehicle and mounted so as to provide relative movement thereto, said receiver being responsive to reflected energy to supply a signal for controlling the position of said transmitter and receiver and said instrumentality to a position corresponding to said reference datum.

2. Control apparatus comprising; an earth working instrumentality; a vehicle adapted to carry said earth working instrumentality; control means mounted on said vehicle and connected to control the position of said instrumentality relative to a reference datum; means for establishing a reference datum including a tri-planar reflecting device and further means for restricting the reflection of incident energy thereon so that a reference datum is defined by the apex of said reflector and said restriction; transmitting and receiving means carried by said vehicle and mounted so as to provide relative movement thereto, said receiving means being responsive to reflected energy to supply a signal for controlling the position of said transmitting and receiving means; and motor means controlled by the output of said receiving means for positioning said earth working instrumentality relative to said reference datum.

3. In apparatus of the class above described; reflector means including a plurality of mutually perpendicular elements positioned so that incident energy from a source is reflected back upon itself, means for restricting reflection of incident energy, said last named means and the apex of said elements defining a reference datum; a vehicle; an earth moving instrumentality carried by said vehicle; control means for positioning said instrumentality relative to said vehicle; a source of energy mounted on said instrumentality; detector means also mounted on said instrumentality and responsive to energy reflected from said reflector means to supply a signal indicative of the position of said detector means with respect to said reference datum; and means connecting the output of said detector means to said control means for positioning said instrumentality, said source of energy and said detector means in accordance with said reference datum.

4. Earth working apparatus comprising; an earth working instrumentality mounted upon a vehicle for movement relative thereto; a remotely positioned reflector establishing a reference datum established by a point on the line defined by the intersection of a pair of reflective surfaces positioned normal to one another; sensing means connected to said earth working instrumentality for sensing said reference datum including a source of radiant energy and detector means responsive to radiant energy reflected by said reflective surfaces; means to rotate said sensing means about said reference datum; and servo control means responsive to the output of said sensing means for positioning said earth working instrumentality and said sensing means relative to said vehicle in accordance with said reference datum.

5. Earth working apparatus comprising; an earth working instrumentality mounted upon a vehicle for movement relative thereto; a remotely positioned reflector establishing a reference datum established by the point on the line defined by the intersection of a pair of reflective surfaces positioned normal to one another; sensing means mounted upon the vehicle for sensing said reference datum including a source of energy and detector means responsive to energy reflected by said reflective surfaces; means for rotating said sensing means about said reference datum; and servo control means responsive to the output of said sensing means for positioning said earth working instrumentality and said sensing means relative to said vehicle in accordance with said reference datum.

6. Earth working apparatus comprising; an earth working instrumentality; a vehicle for carrying said earth working instrumentality; means remote from said vehicle for establishing a reference datum, said means including a reflector of incident energy positioned so that energy incident thereon may be selectively reflected so as to form said reference datum; means, including an emitter and detector of energy, mounted for cyclic reciprocation about an axis and associated with said earth moving instrumentality for providing a signal for controlling the position of said earth moving instrumentality relative to said reference datum; inertial and energy responsive means controlling the attitude of said last named means so that said last named means is oriented toward said reference datum; and servo control means mounted upon said vehicle and responsive to said signal for positioning said earth working instrumentality relative to said reference datum.

7. Earth working apparatus comprising; an earth working instrumentality; a vehicle for carrying said earth working instrumentality; means remote from said vehicle for establishing a reference datum, said means including a reflector of incident energy positioned so that energy incident thereon may be selectively reflected so as to form said reference datum; reference datum detecting means, including an emitter and detector of energy, mounted for cyclic reciprocation about an axis and associated with said earth moving instrumentality for providing a signal for controlling the position of said earth moving instrumentality relative to said reference datum; inertial and energy responsive means controlling the attitude of said reference datum detecting means so that said reference datum detecting means is oriented toward said reference datum; and servo control means mounted upon said vehicle and responsive to said signal for positioning said earth working instrumentality relative to said reference datum.

8. Control apparatus comprising; a vehicle adapted to move over an area of earth to be worked, an earth working instrumentality carried by said vehicle and mounted for elevation movement relative thereto; omnidirectional reflector means positioned at a given location in the area to be worked, said reflector means including means for restricting the reflection of incident energy therefrom to establish an elevational datum; sensing means mounted on said vehicle for movement in both elevation and bearing relative thereto, said sensing means including a transmitter of energy and first and second energy receiver means; stabilization means connected to said sensing means for maintaining said sensing means in a predetermined elevation attitude; means including said first energy receiving means for providing a first signal in accordance with the bearing of said sensing means relative to said reflector means, control means connected to said first energy receiving means for producing bearing movement of said sensing means in accordance with said first signal to cause said sensing means to be directed toward said reflector means; further means including said second energy receiving means for providing a second signal in accordance with the elevation of said sensing means relative to said reflector means, and means controlled by said second signal to position said sensing means and said earth working instrumentality in elevation relative to said elevational datum.

9. In earth moving equipment wherein an earth moving instrumentality is to be positioned for operation in a predetermined attitude with respect to a reference datum; an earth moving instrumentality; remotely positioned reflector means including a reflector of incident energy positioned so that energy incident thereon is reflected to establish a reference datum; sensing means, including a source of energy and receiver means responsive to said source of energy, connected to said earth moving instrumentality; and means responsive to the output of said sensing means for positioning said sensing means and said earth moving instrumentality in accordance with said reference datum.

10. In earth moving equipment wherein an earth moving instrumentality is to be positioned for operation in a predetermined attitude with respect to a reference datum; a vehicular mounted earth moving instrumentality; omnidirectional reflector means positioned remotely of said vehicular mounted earth moving instrumentality, said reflector means including means for restricting the reflection of incident energy therefrom to establish a reference datum; sensing means, including a source of energy and receiver means responsive to said source of energy, mounted on said vehicle and movable relative thereto; and motor means responsive to the output of said sensing means for positioning said sensing means and said earth moving instrumentality in accordance with said reference datum.

References Cited in the file of this patent

UNITED STATES PATENTS

| | | |
|---|---|---|
| 2,472,944 | Furer et al. | June 14, 1949 |
| 2,521,946 | Rathje | Sept. 12, 1950 |
| 2,796,685 | Bensinger | June 25, 1957 |
| 2,896,089 | Wesch | July 21, 1959 |
| 2,916,836 | Stewart et al. | Dec. 15, 1959 |
| 2,930,893 | Carpenter et al. | Mar. 29, 1960 |
| 2,934,755 | Canada | Apr. 26, 1960 |
| 2,943,201 | Hicks et al. | June 28, 1960 |
| 2,973,593 | Zellner et al. | Mar. 7, 1961 |